United States Patent
Jeong et al.

(10) Patent No.: US 11,470,388 B2
(45) Date of Patent: Oct. 11, 2022

(54) METHOD AND APPARATUS FOR PREVENTING FORGERY OF DATA, METHOD AND APPARATUS FOR DETECTING FORGERY OF DATA

(71) Applicant: SAMSUNG SDS CO., LTD., Seoul (KR)

(72) Inventors: Yong Hyun Jeong, Seoul (KR); Do Yeon Kim, Seoul (KR); Min Ki Hong, Seoul (KR); Chang Hyun Park, Seoul (KR); Se Hyeon Park, Seoul (KR); Kwan Sik Yoon, Seoul (KR); Sol Bi Hwang, Seoul (KR); Jae Hyeon Lee, Seoul (KR); Hyun Chul Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/366,570

(22) Filed: Jul. 2, 2021

(65) Prior Publication Data
US 2022/0014800 A1 Jan. 13, 2022

(30) Foreign Application Priority Data
Jul. 7, 2020 (KR) .................. 10-2020-0083713

(51) Int. Cl.
*H04N 21/4402* (2011.01)
*G06K 9/62* (2022.01)
*G06V 20/00* (2022.01)
*G06T 1/00* (2006.01)

(52) U.S. Cl.
CPC ... *H04N 21/440254* (2013.01); *G06K 9/6256* (2013.01); *G06V 20/95* (2022.01); *G06T 1/0028* (2013.01); *G06T 2201/0051* (2013.01)

(58) Field of Classification Search
CPC ........ H04N 21/440254; G06K 9/6256; G06V 20/95; G06T 1/0028; G06T 2201/0051; G06F 21/64; G06F 16/38; H04L 63/0428
See application file for complete search history.

(56) References Cited

U.S. PATENT DOCUMENTS

| 2002/0106103 | A1 | 8/2002 | Jones et al. |
| 2021/0334931 | A1* | 10/2021 | Kwon .................. H04N 19/467 |

FOREIGN PATENT DOCUMENTS

| KR | 10-2023101 B1 | 11/2019 |
| WO | WO 2014/078696 A2 | 5/2014 |
| WO | WO 2019/225903 A1 | 11/2019 |

OTHER PUBLICATIONS

European Search Report For EP 21181796.0 dated Dec. 3, 2021 from European patent office in a counterpart European patent application.

(Continued)

*Primary Examiner* — Christopher Wait
*Assistant Examiner* — Christopher D Wait
(74) *Attorney, Agent, or Firm* — The PL Law Group, PLLC

(57) ABSTRACT

A method for preventing forgery of data according to an embodiment includes determining a noise level based on metadata of original data, generating noise by applying the determined noise level to a preset noise pattern, generating transformed data of the original data by adding the generated noise to the original data, and transmitting the transformed data and the metadata to a server.

30 Claims, 6 Drawing Sheets

(56) References Cited

OTHER PUBLICATIONS

Muhammad Aizad Fayyaz et al., "An improved surveillance video forgery detection technique using sensor pattern noise and correlation of noise residues", Multimedia Tools and Applications, Dec. 9, 2019, pp. 5767-5788, vol. 79, Kluwer Academic Publishers, Boston, US.

Korus Pawel, "Digital image integrity—a survey of protection and verification techniques", Digital Signal Processing, Dec. 31, 2017, pp. 1-26, vol. 71.

\* cited by examiner

METHOD AND APPARATUS FOR PREVENTING FORGERY OF DATA, METHOD AND APPARATUS FOR DETECTING FORGERY OF DATA

CROSS-REFERENCE TO RELATED APPLICATION(S)

This application claims the benefit under 35 USC § 119(a) of Korean Patent Application No. 10-2020-0083713, filed on Jul. 7, 2020, in the Korean Intellectual Property Office, the entire disclosure of which is incorporated herein by reference for all purposes.

BACKGROUND

1. Field

The following description relates to a technology for preventing forgery of data.

2. Description of Related Art

The technology in the related art for determining forgery of multimedia data such as images and videos has been developed based on a state in which a digital photographing apparatus is connected to a network, and has a problem in that, when data stored in a device is accessed in an asynchronous environment without a network connection, forged, and then uploaded to a server, it is difficult to verify forgery of data.

In addition, in the technology in the related art, there is a limit to covering even real-time forgery verification of voice generated during a call.

SUMMARY

Embodiments disclosed in the present disclosure are to provide a method and apparatus for preventing forgery of data.

In one general aspect, there is provided a method for preventing forgery of data according to an embodiment, including determining a noise level based on metadata of original data, generating noise by applying the determined noise level to a preset noise pattern, generating transformed data of the original data by adding the generated noise to the original data, and transmitting the transformed data and the metadata to a server.

The metadata may include data related to at least one of an attribute of the original data, a generation time of the original data, a location where the original data is generated, a device that generates the original data, and a user who generates the original data.

The determining may include determining the noise level from the metadata according to a method agreed upon with the server in advance.

The preset noise pattern may be a noise pattern selected from among a plurality of noise patterns agreed upon with the server in advance.

The generating of the noise may include selecting one of a plurality of noise patterns based on the metadata and generating the noise by applying the determined noise level to the selected noise pattern.

The selecting may include selecting one of the plurality of noise patterns according to a selection method agreed upon with the server in advance, based on the metadata.

The transmitting may include transmitting, to the server, identification information on the selected noise pattern together with the transformed data and the metadata.

In another general aspect, there is provided a method for detecting forgery of data, including receiving transformed data of original data and metadata of the original data from a client device, determining a noise level based on the metadata, generating estimated data for the original data from the transformed data based on a preset noise pattern, estimating noise added to the original data to generate the transformed data, based on the transformed data and the estimated data, estimating a noise level corresponding to the estimated noise based on the noise pattern and the estimated noise, and determining whether the transformed data is forged based on the determined noise level and the estimated noise level.

The metadata may include data related to at least one of an attribute of the original data, a generation time of the original data, a location where the original data is generated, a device that generates the original data, and a user who generates the original data.

The generating of the estimated data may include generating estimated data for the original data from the transformed data by using a denoise model corresponding to the preset noise pattern.

The preset noise pattern may be a noise pattern selected from among a plurality of noise patterns agreed upon with the client device in advance.

The generating of the estimated data may include selecting one from among a plurality of noise patterns based on the metadata and generating estimated data for the original data from the transformed data by using a denoise model corresponding to the selected noise pattern.

The receiving may include receiving, from the client device, identification information on a noise pattern corresponding to the noise added to the original data together with the transformed data and the metadata, and the generating of the estimated data may include selecting a noise pattern corresponding to the identification information from among the plurality of noise patterns and generating estimated data for the original data from the transformed data by using a denoise model corresponding to the selected noise pattern.

The estimating of the noise level may include estimating the noise level corresponding to the estimated noise from the noise pattern and the estimated noise by using a pre-trained noise level estimation model.

The estimating of the noise level may include concatenating an image corresponding to the preset noise pattern to an image corresponding to the estimated noise, dividing the concatenated images into preset image patch units, and estimating a noise level for each region included in a sliding window of a preset size by using the noise level estimation model while sequentially moving the sliding window in the concatenated images, and the determining may include determining whether the transformed data is forged based on the estimated noise level and the determined noise level for each region included in the sliding window.

In still another general aspect, there is provided an apparatus for preventing forgery of data, including a noise level determiner configured to determine a noise level based on metadata of original data, a noise applier configured to generate noise by applying the determined noise level to a preset noise pattern, and generate transformed data of the original data by adding the generated noise to the original data, and transmitter configured to transmit the transformed data and the metadata to a server.

The metadata may include data related to at least one of an attribute of the original data, a generation time of the original data, a location where the original data is generated, a device that generates the original data, and a user who generates the original data.

The noise level determiner may determine the noise level from the metadata according to a method agreed upon with the server in advance.

The preset noise pattern may be a noise pattern selected from among a plurality of noise patterns agreed upon with the server in advance.

The noise applier may select one from among a plurality of noise patterns based on the metadata and generate the noise by applying the determined noise level to the selected noise pattern.

The noise applier may select one from among the plurality of noise patterns according to a selection method agreed upon with the server in advance, based on the metadata.

The transmitter may transmit, to the server, identification information on the selected noise pattern together with the transformed data and the metadata.

In yet still another general aspect, there is provided an apparatus for detecting forgery of data, including a receiver is configured to receive transformed data of original data and metadata of the original data from a client device, a noise level determiner configured to determine a noise level based on the metadata, a noise estimator is configured to generate estimated data for the original data from the transformed data based on a preset noise pattern and estimating noise added to the original data to generate the transformed data based on the transformed data and the estimated data, a noise level estimator is configured to estimate a noise level corresponding to the estimated noise based on the noise pattern and the estimated noise, and a determiner configured to determine whether the transformed data is forged based on the determined noise level and the estimated noise level.

The metadata may include data related to at least one of an attribute of the original data, a generation time of the original data, a location where the original data is generated, a device that generates the original data, and a user who generates the original data.

The noise estimator may generate estimated data for the original data from the transformed data by using a denoise model corresponding to the preset noise pattern.

The preset noise pattern may be a noise pattern selected from among a plurality of noise patterns agreed upon with the client device in advance.

The noise estimator may select one from among a plurality of noise patterns based on the metadata and generate estimated data for the original data from the transformed data by using a denoise model corresponding to the selected noise pattern.

The receiver may receive, from the client device, identification information on a noise pattern corresponding to the noise added to the original data together with the transformed data and the metadata, and the noise estimator may select a noise pattern corresponding to the identification information from among the plurality of noise patterns and generate estimated data for the original data from the transformed data by using a denoise model corresponding to the selected noise pattern.

The noise level estimator may estimate the noise level corresponding to the estimated noise from the noise pattern and the estimated noise by using a pre-trained noise level estimation model.

The noise level estimator may concatenate an image corresponding to the preset noise pattern to an image corresponding to the estimated noise, divide the concatenated images into preset image patch units, and estimate a noise level for each region included in a sliding window of a preset size by using the noise level estimation model while sequentially moving the sliding window in the concatenated images, and the determiner may determine whether the transformed data is forged based on the estimated noise level and the determined noise level for each region included in the sliding window.

According to the disclosed embodiments, different noise may be added to the original data according to the metadata and noise pattern by adding, to the original data, the noise level determined based on the metadata of the original data and the noise generated based on the pre-set noise pattern, which makes it possible to easily detect forgery regardless of the type of the original data.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
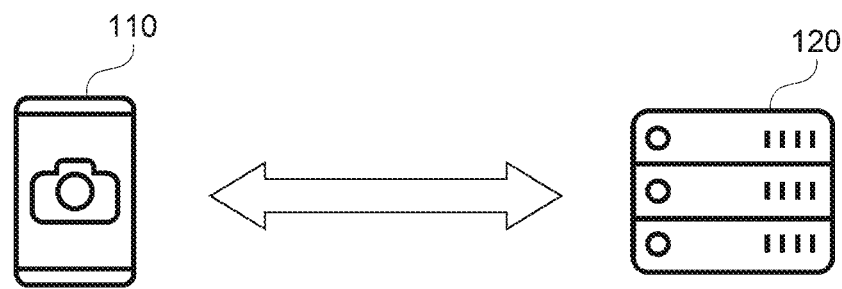
FIG. 1 is a configuration diagram for illustrating an example of a system for preventing forgery to which a data forgery prevention technology according to an embodiment is applied.

FIG. 1 is a configuration diagram for illustrating an example of a system 100 for preventing forgery to which a data forgery prevention technology according to an embodiment is applied.

Referring to FIG. 1, the system 100 for preventing forgery according to an embodiment includes a client device 110 and a server 120.

The client device 110 is a device that holds original data, and generates transformed data of the original data by adding noise for preventing forgery to the original data and provides the generated transformed data to the server 120 through a wired or wireless network.

In this case, the original data may be, for example, image data, video data, audio data, or the like, but is not necessarily limited to a specific form.

Meanwhile, that the client device 110 holds the original data may mean that the client device 110 stores the original data in an internal storage means or an external storage means connected to the client device 110.

Meanwhile, according to an embodiment, the original data may be directly generated by the client device 110 or may be generated by an external device connected to the client device 110 in a wired or wireless manner and provided to the client device 110. For example, the client device 110 may include at least one of an image acquisition means such as an imaging device and a voice acquisition means such as a microphone, and may generate the original data by using a signal acquired through the means. For another example, the client device 110 may receive, from an external device including at least one of an image acquisition means and a voice acquisition means, the original data generated by the external device through a safe path.

Meanwhile, the client device 110 may be, for example, a smartphone, a tablet PC, a desktop PC, a laptop PC, a phablet, a smartwatch, or the like, but is not necessarily limited to a specific type of device.

The server 120 receives transformed data of the original data from the client device 110 and determines whether the received transformed data is forged.

In an embodiment, the server 120 may be included as a component of a system for providing a specific service to the client device 110 or a user of the client device 110 according to the determination result of forgery of the transformed data. For example, the server 120 may be included as a component of a system for providing an insurance claim service, and in this case, the original data may be image data obtained by photographing documentary evidence for claiming insurance payments.

Figure 2:
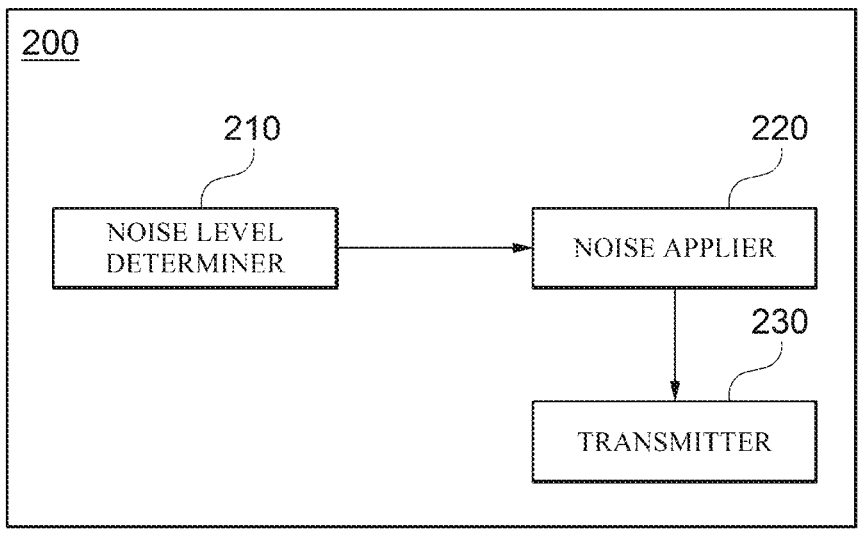
FIG. 2 is a configuration diagram of apparatus for preventing forgery for preventing forgery according to an embodiment.

FIG. 2 is a configuration diagram of an apparatus for preventing forgery according to an embodiment.

Referring to FIG. 2, an apparatus for preventing forgery 200 according to an embodiment includes a noise level determiner 210, a noise applier 220, and a transmitter 230.

According to an embodiment, the apparatus for preventing forgery 200 may be implemented as a component included in the client device 110 illustrated in FIG. 1.

In addition, according to an embodiment, the noise level determiner 210, the noise applier 220, and the transmitter 230 may be implemented by one or more hardware processors or a combination of one or more hardware processors and software, and may not be clearly distinguished in specific operations, unlike the illustrated example.

The noise level determiner 210 determines a noise level based on metadata of the original data.

In this case, according to an embodiment, the metadata may include data related to at least one of an attribute of the original data, a generation time of the original data, a location where the original data is generated, a device that generates the original data, and a user who generates the original data.

For example, data related to the attribute of the original data may refer to data for indicating the attributes of the original data, such as the file size, resolution, playback time, and identification information (e.g., filename) of the original data.

The data related to the generation time of the original data may refer to data for indicating the time when the original data is generated, and may include at least one of, for example, a date, a time, and a day of the week when the original data is generated.

The data related to the location where the original data is generated may refer to data for indicating the location of the device that generates the original data (for example, the client device 110 or an external device connected to the client device 110) at the time when the original data is generated. For example, the data related to the location where the original data is generated may be location data measured by using GPS data, but the method for obtaining the location data is not necessarily limited to a specific method.

The data related to the device that generates the original data may be, for example, device identification information (e.g., MAC address, device name, or the like) of the device that generates the original data, but may include various data that may be acquired from the device that generates the original data, in addition to the device identification information.

The data related to the user who generates the original data may be user identification information (e.g., the personal identification number (PIN), user name, user ID, or the like) for the user of the device that generates the original data, but may include various data that may be acquired from the user, such as age, gender, name, or the like, in addition to the user identification information.

Meanwhile, the metadata is not necessarily limited to the above-described examples, and may include various types of data related to the original data in addition to the above-described examples.

Meanwhile, according to an embodiment, the noise level determiner 210 may determine a noise level from the metadata according to a preset method.

In this case, the method for determining the noise level is not necessarily limited to a specific method, and may include various methods that may use the metadata as an input and generate any non-zero constant value according to the input metadata.

In addition, according to an embodiment, the method for determining the noise level may be a method agreed upon by the server 120 and the client device 110 in advance.

The noise applier 220 generates noise by applying the noise level determined by the noise level determiner 210 to a preset noise pattern, and generates transformed data of the original data by adding the generated noise to the original data.

In this case, the preset noise pattern may be, for example, a noise pattern following a specific distribution, such as a Gaussian distribution, a Rayleigh distribution, a gamma distribution, and an exponential distribution.

Meanwhile, according to an embodiment, the preset noise pattern may be a noise pattern selected from among a plurality of noise patterns agreed upon with the server 120 in advance.

Specifically, according to an embodiment, the noise applier 220 may randomly select one from among the plurality of noise patterns agreed upon with the server 120 in advance.

According to another embodiment, the noise applier 220 may select one from among the plurality of noise patterns agreed upon with the server 120 in advance based on metadata of the original data.

For example, assuming that a first noise pattern following the Gaussian distribution and a second noise pattern following the gamma distribution are agreed upon with the server 120 in advance, the noise applier 220 may select the first noise pattern when the generation time of the original data is between 00:00 and 11:59, and select the second noise pattern when the generation time thereof is between 12:00 and 23:59. For another example, the noise applier 220 may select the first noise pattern when the location of the device that generates the original data at the generation time of the original data is within a preset region, and select the second noise pattern when the location is outside the preset region.

The method for selecting one of the plurality of noise patterns agreed upon in advance based on the metadata of the original data is not necessarily limited to the above-described example, and may be variously modified depending on embodiments. In addition, according to an embodiment, the method for selecting one of the plurality of noise patterns agreed upon in advance based on the metadata of the original data may be a selection method agreed upon with the server 120 in advance.

Meanwhile, when the noise level and the noise pattern are determined, the noise applier 220 may generate noise by scaling the noise pattern by the noise level, and generate the transformed data by adding the generated noise to the original data.

Figure 3:
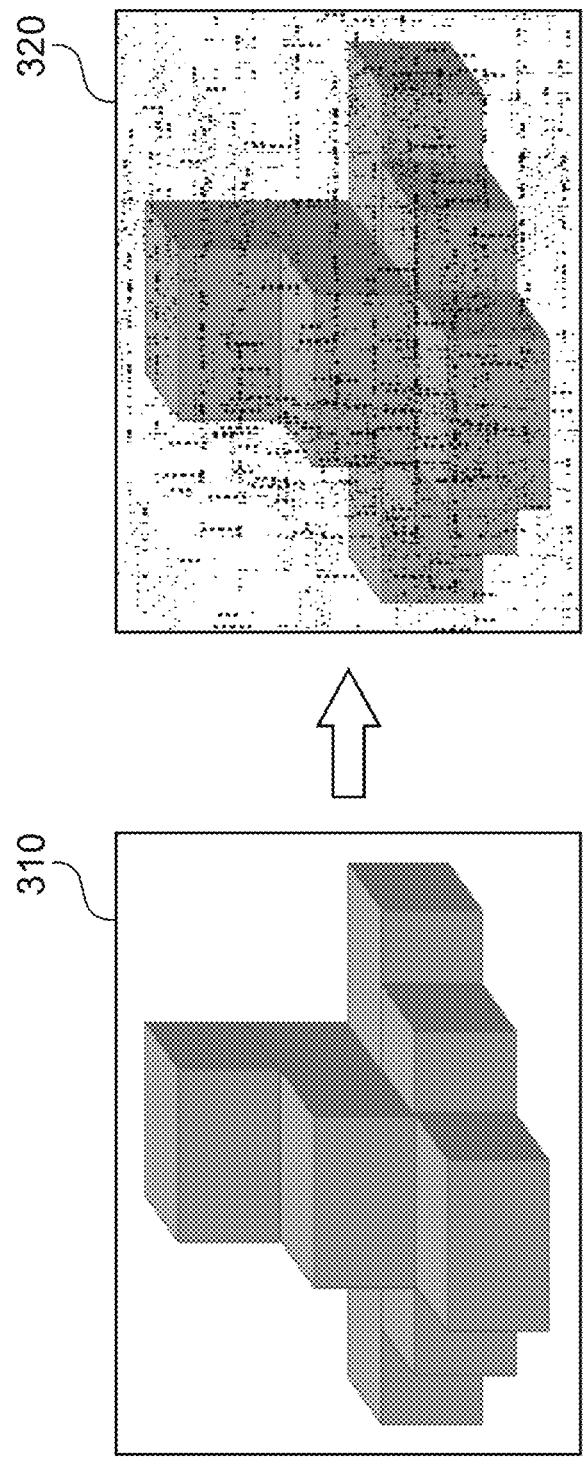
FIG. 3 is an exemplary diagram for illustrating an example of transformed data generated by adding noise to image data that is original data.

Specifically, FIG. 3 is an exemplary diagram for illustrating an example of transformed data 320 generated by adding noise to image data 310, which is the original data.

As illustrated in FIG. 3, when the original data is the image data 310 consisting of M×N pixels, the transformed data 320 may be generated as shown in Equation 1 below.

$$P(i,j)=R(i,j)+\varepsilon \cdot N(i,j) \quad \text{[Equation 1]}$$

Here, (i,j) denotes the pixel coordinates, P(i,j) denotes the transformed data, R(i,j) denotes the original data, ε is the noise level, and N(i,j) denotes the noise pattern.

Figure 4:
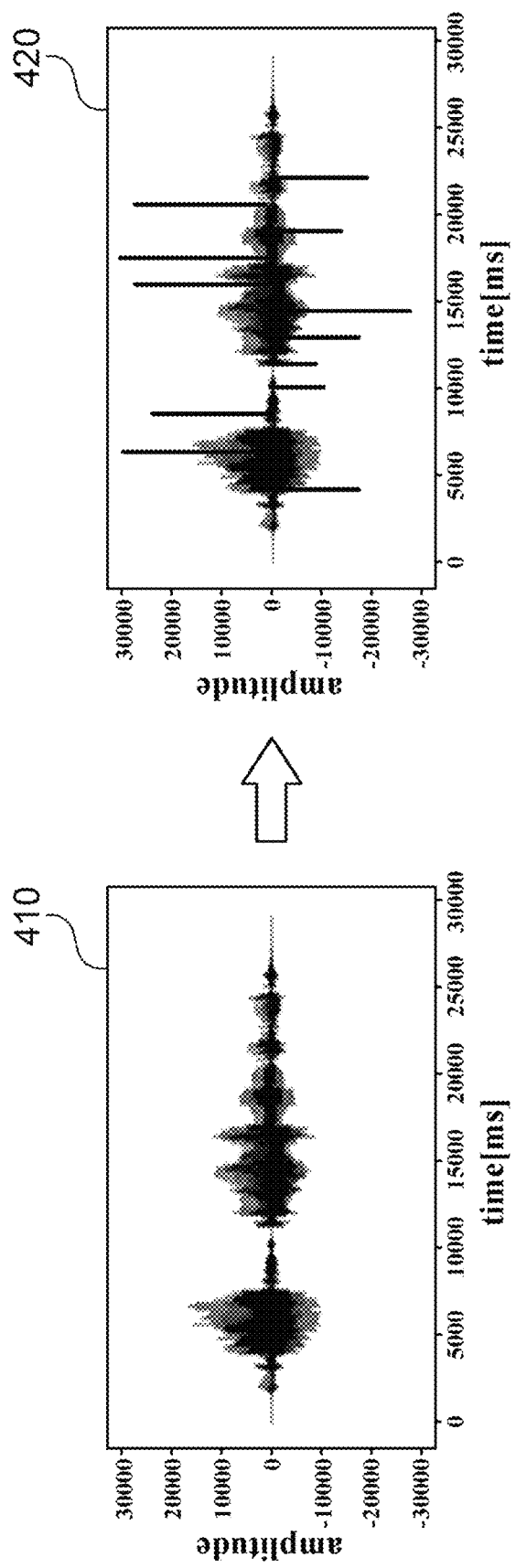
FIG. 4 is an exemplary diagram for illustrating an example of transformed data generated by adding noise to a voice signal that is original data.

Meanwhile, FIG. 4 is an exemplary diagram for illustrating an example of transformed data 420 generated by adding noise to a voice signal 410, which is original data.

As illustrated in FIG. 4, when the original data is time-series data that changes over time t, such as the voice signal 410, the transformed data 420 may be generated as shown in Equation 2 below.

$$P(t)=R(t)+\varepsilon \cdot N(t) \quad \text{[Equation 2]}$$

Here, P(t) denotes the transformed data, R(t) denotes the original data, c denotes the noise level, and N(t) denotes the noise pattern.

Meanwhile, the transmitter 230 transmits the transformed data generated by the noise applier 220 and the metadata of the original data of the transformed data to the server 120.

In this case, according to an embodiment, when the noise added to the original data to generate the transformed data is randomly selected from among the plurality of noise patterns agreed upon with the server 120 in advance, or generated by using the selected noise pattern according to a method that is not agreed upon with the server 120 in advance, the transmitter 230 may transmit, to the server 120, identification information on the selected noise pattern together with the transformed data and the metadata. In this case, the identification information on the selected noise pattern may include various information that the server 120 may use to specify one of a plurality of noise patterns agreed upon with the client device 110 in advance.

Meanwhile, according to an embodiment, when the client device 110 and the server 120 are not connected through a network, the transmitter 230 may store the generated transformed data, in a safe security region, for example, a trusted execution environment (TEE), a secure element (SE), or the like. In this case, the transmitter 230 may transmit, to the server 120, the transformed data stored in the secure region after the client device 110 and the server 120 are connected through a network.

Figure 5:
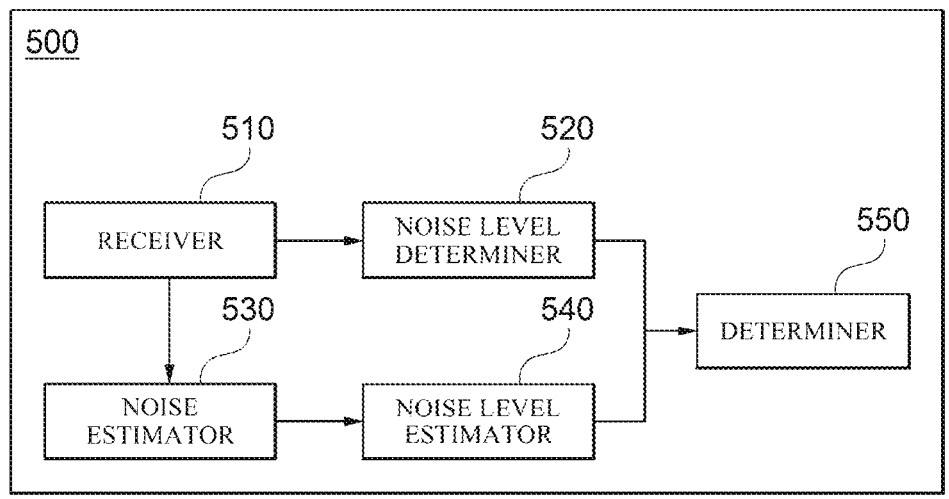
FIG. 5 is a configuration diagram of an apparatus for detecting forgery of data according to an embodiment.

FIG. 5 is a configuration diagram of an apparatus for detecting forgery of data according to an embodiment.

Referring to FIG. 5, an apparatus for detecting forgery of data 500 includes a receiver 510, a noise level determiner 520, a noise estimator 530, a noise level estimator 540, and a determiner 550.

According to an embodiment, the apparatus for detecting forgery 500 may be implemented as a component included in the server 120 illustrated in FIG. 1.

In addition, according to an embodiment, the receiver 510, the noise level determiner 520, the noise estimator 530, the noise level estimator 540, and the determiner 550 may be implemented by one or more hardware processors or a combination of one or more hardware processors and software, and may not be clearly distinguished in specific operations, unlike the illustrated example.

The receiver 510 receives transformed data of original data and metadata of the original data from the client device 110.

In this case, according to an embodiment, the receiver 510 may receive, from the client device 110, identification information on a noise pattern corresponding to noise added to the original data to generate the transformed data together with the transformed data and the metadata.

For example, as described above, when the client device 110 randomly selects one from among the plurality of noise patterns agreed upon with the server 120 in advance to generate noise to be added to the original data, or selects a noise pattern according to a method that is not shared with the server 120 in advance, the receiver 510 may receive, from the client device 110, the identification information on the noise pattern selected by the client device 110.

The noise level determiner 520 determines a noise level based on the metadata received from the client device 110.

In this case, the noise level determiner 520 may determine the noise level from the metadata received from the client device 110 according to the method agreed upon with the client device 110 in advance.

In this case, the method agreed upon in advance is not necessarily limited to a specific method, and may include various methods that may use the metadata as an input and generate any non-zero constant value according to the metadata.

The noise estimator 530 generates estimated data for the original data of the transformed data from the transformed data received from the client device 110 based on the preset noise pattern and estimates the noise added to the original data to generate the transformed data based on the transformed data and the estimated data.

According to an embodiment, the noise estimator 530 may generate estimated data for the original data from the transformed data received from the client device 110 by using a denoise model corresponding to the preset noise pattern.

In this case, the denoise model may be, for example, a denoise filter using a pre-designed filtering algorithm to remove noise corresponding to the preset noise pattern.

For another example, the denoise model may be a model trained in advance to generate the estimated data for the original data from any transformed data input to the denoise model by using the original data to which noise is not applied and the transformed data generated by adding, to the original data, any noise satisfying the preset noise pattern, as a training data pair. In this case, the denoise model may be, for example, a learning model based on a deep neural network, but is not necessarily limited to a specific type of model as long as it is a model capable of being trained through machine learning.

Meanwhile, the denoise model is not necessarily limited to the above-described example, and various types of known denoise models may be used in addition to the above-described example, depending on embodiments.

Meanwhile, according to an embodiment, the preset noise pattern may be a noise pattern selected from among a plurality of noise patterns agreed upon with the client device 110 in advance. In this case, there may be a plurality of denoise models corresponding to the plurality of noise patterns agreed upon with the client device 110 in advance, respectively, and the noise estimator 530 may generate the estimated data for the original data by using a denoise model corresponding to the noise pattern selected from among the plurality of denoise models.

Specifically, according to an embodiment, the noise estimator 530 may select one from among the plurality of noise patterns agreed upon with the client device 110 in advance according to the selection method agreed upon with the client device 110 in advance, based on meta information of the original data received from the client device 110.

According to another embodiment, the noise estimator 530 may select a noise pattern corresponding to the identification information on the noise pattern received from the client device 110 from among the plurality of noise patterns agreed upon with the client device 110 in advance.

Meanwhile, when the estimated data for the original data is generated, the noise estimator 530 may estimate the noise added to the original data based on the difference between the transformed data and the estimated data, for example, as in Equation 3 or 4 below.

Specifically, when the transformed data received from the client device 110 is transformed data of original data, which is image data, noise added to the original data may be estimated using Equation 3 below.

$$\varepsilon' \cdot N'(i,j) = P(i,j) - R'(i,j)$$ [Equation 3]

Here, $P(i,j)$ denotes the transformed data received from the client device 110, $R'(i,j)$ denotes the estimated data, and $\varepsilon' \cdot N'(i,j)$ denotes the estimation value of the noise added to the original data.

Meanwhile, when the transformed data received from the client device 110 is transformed data of original data, which is time-series data that changes over time t, such as a voice signal, noise added to the original data may be estimated using Equation 4 below.

$$\varepsilon' \cdot N'(t) = P(t) - R'(t)$$ [Equation 4]

Here, $P(t)$ denotes the transformed data received from the client device 110, $R'(t)$ denotes the estimated data, and $\varepsilon' \cdot N'(t)$ denotes the estimation value of the noise added to the original data.

The noise level estimator 540 estimates a noise level corresponding to the estimated noise based on the noise pattern and the estimated noise used for noise estimation by the noise estimator 530.

According to an embodiment, the noise level estimator 540 may estimate a noise level corresponding to the noise estimated by the noise estimator 530 by using the noise level estimation model trained in advance through machine learning.

In this case, the noise level estimation model may be, for example, a deep neural network-based model or a regression model, but is not necessarily limited to a specific type of model as long as it is a model that is possible to be trained through machine learning.

According to an embodiment, the noise level estimator 540 may concatenate the first image corresponding to the noise pattern used for noise estimation to a second image corresponding to the estimated noise, and then divide the concatenated images into preset image patch units.

Then, the noise level estimator 540 may estimate a noise level for each region included in the sliding window by using the noise estimation model while sequentially moving the sliding window of the preset size in the concatenated images. In this case, the size, unit movement distance, and movement direction of the sliding window may be preset by the user and may vary depending on embodiments.

The determiner 550 determines whether the transformed data received from the client device 110 is forged based on the noise level determined by the noise level determiner 520 and the noise level estimated by the noise level estimator 540.

Specifically, according to an embodiment, when the difference between the determined noise level and the estimated noise level is out of a preset range, the determiner 550 may determine that the transformed data received from the client device 110 is forged.

Meanwhile, according to an embodiment, when the noise level for each region included in the sliding window is estimated as described above, the determiner 550 may determine whether the transformed data received from the client device 110 is forged based on the noise level estimated for each region and the noise level determined by the noise level determiner 520.

For example, when the difference between the average value of the noise level estimated for each region and the noise level determined by the noise level determiner 520 is out of a preset range, the determiner 550 may determine that the transformed data received from the client device 110 is forged.

For another example, when there is a noise level of which the difference from the noise level determined by the noise level determiner 520 is out of the preset range among the noise levels estimated for each region, the determiner 550 may determine that the transformed data received from the client device 110 is forged.

Figure 6:
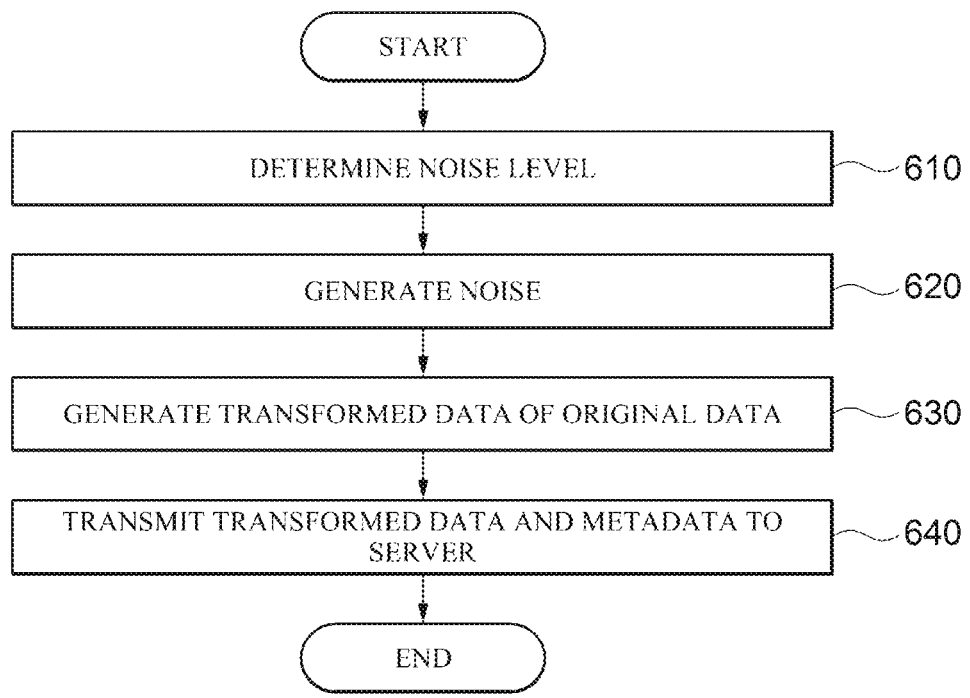
FIG. 6 is a flowchart of a method for preventing forgery of data according to an embodiment.

FIG. 6 is a flowchart of a method for preventing forgery of data according to an embodiment.

The method illustrated in FIG. 6 may be performed, for example, by the apparatus for preventing forgery 200 illustrated in FIG. 2.

Referring to FIG. 6, the apparatus for preventing forgery 200 determines a noise level based on metadata of the original data (610).

In this case, according to an embodiment, the apparatus for preventing forgery 200 may determine a noise level from the metadata according to a method agreed upon with the server 120 in advance.

Then, the apparatus for preventing forgery 200 generates noise by applying the determined noise level to a preset noise pattern (620).

In this case, according to an embodiment, the preset noise pattern may be a noise pattern selected from among a plurality of noise patterns agreed upon with the server 120 in advance.

Specifically, according to an embodiment, the apparatus for preventing forgery 200 may randomly select one from among the plurality of noise patterns agreed upon with the server 120 in advance.

According to another embodiment, the apparatus for preventing forgery 200 may select one from among the plurality of noise patterns agreed upon with the server 120 in advance based on metadata of the original data. In this case, according to an embodiment, the method for selecting one of the plurality of noise patterns agreed upon in advance based on the metadata of the original data may be a selection method agreed upon with the server 120 in advance.

Then, the apparatus for preventing forgery 200 generates transformed data of the original data by adding the generated noise to the original data (630).

Then, the apparatus for preventing forgery 200 transmits the transformed data and the metadata to the server 120 (640).

In this case, according to an embodiment, when the noise added to the original data to generate the transformed data is randomly selected from among the plurality of noise patterns agreed upon with the server 120 in advance, or is generated by using the selected noise pattern according to a method that is not shared with the server 120 in advance based on the metadata of the original data, the apparatus for preventing forgery 200 may transmit, to the server 120, identification information on the selected noise pattern together with the transformed data and the metadata.

Meanwhile, in the flowchart illustrated in FIG. 6, at least some of the steps may be performed in a different order, performed together in combination with other steps, omitted, performed in subdivided steps, or performed by adding one or more steps not illustrated.

Figure 7:
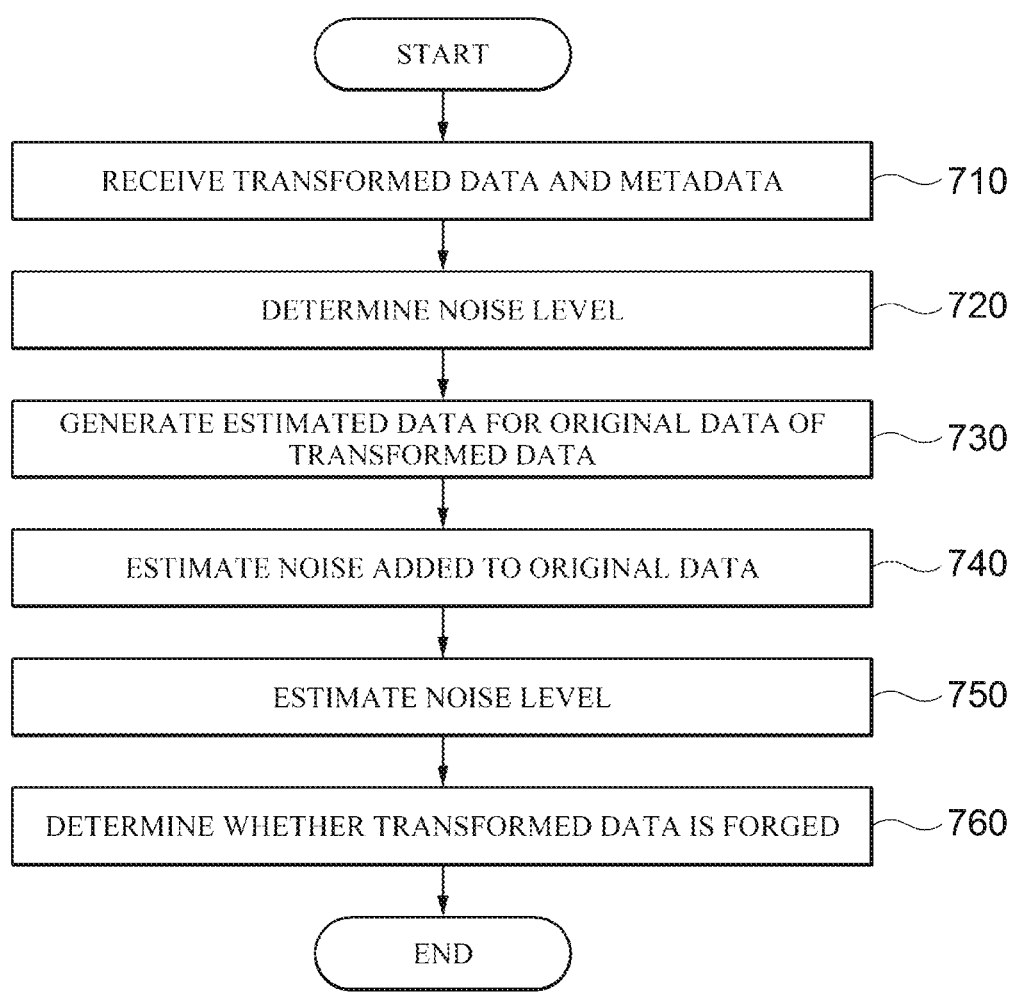
FIG. 7 is a flowchart of a method for detecting forgery of data according to an embodiment.

FIG. 7 is a flowchart of a method for detecting forgery of data according to an embodiment.

The method illustrated in FIG. 7 may be performed, for example, by the apparatus for detecting forgery 500 illustrated in FIG. 5.

Referring to FIG. 7, first, the apparatus for detecting forgery 500 receives transformed data of original data and metadata of the original data from the client device 110 (710).

In this case, according to an embodiment, the data received from the client device 110 may include identification information on a noise pattern corresponding to noise added to the original data to generate the transformed data.

Then, the apparatus for detecting forgery 500 determines a noise level based on the received metadata (720).

In this case, according to an embodiment, the apparatus for detecting forgery 500 may determine a noise level from the received metadata according to a method shared with the client device 110 in advance.

Then, the apparatus for detecting forgery 500 generates estimated data for the original data from the received transformed data based on a preset noise pattern (730).

In this case, according to an embodiment, the apparatus for detecting forgery 500 may generate estimated data for the original data from the transformed data received from the client device 110 by using a denoise model corresponding to the preset noise pattern.

Meanwhile, according to an embodiment, the preset noise pattern may be a noise pattern selected from among a plurality of noise patterns agreed upon with the client device 110 in advance.

Specifically, according to an embodiment, the apparatus for detecting forgery 500 may select one from among the plurality of noise patterns agreed upon with the client device 110 in advance according to the selection method agreed upon with the client device 110 in advance, based on meta information of the original data received from the client device 110.

According to another embodiment, the forgery detection apparatus 500 may select a noise pattern corresponding to the identification information on the noise pattern received from the client device 110 from among the plurality of noise patterns agreed upon with the client device 110 in advance.

Then, the forgery detection apparatus 500 estimates noise added to the original data to generate the transformed data, based on the transformed data and the estimated data (740).

Then, the forgery detection apparatus 500 estimates a noise level corresponding to an estimated noise based on a preset noise pattern and the estimated noise (750).

In this case, according to an embodiment, the forgery detection apparatus 500 may estimate a noise level corresponding to the estimated noise by using a noise level estimation model trained in advance.

Specifically, according to an embodiment, the forgery detection apparatus 500 may estimate a noise level for each region included in a sliding window by using the noise estimation model while sequentially moving the sliding window of the preset size in the concatenated images. In this case, the size, unit movement distance, and movement direction of the sliding window may be preset by the user and may vary depending on embodiments.

Then, the forgery detection apparatus 500 determines whether the transformed data is forged based on the noise level determined in operation 720 and the noise level estimated in operation 750 (760).

In this case, according to an embodiment, when the difference between the noise level determined in operation 720 and the noise level estimated in operation 750 is out of a preset range, the forgery detection apparatus 500 may determine that the transformed data received from the client device 110 is forged.

According to another embodiment, when a plurality of noise levels are estimated by using the sliding window in operation 750, the forgery detection apparatus 500 may determine whether a difference between the average value of the estimated noise levels and the noise level determined in operation 720 is out of the preset range. In this case, when the difference between the average value of the estimated plurality of noise levels and the determined noise level is out of the preset range, the forgery detection apparatus 500 may determine that the transformed data received from the client device 110 is forged.

According to yet another embodiment, when a plurality of noise levels are estimated by using the sliding window in operation 750, the forgery detection apparatus 500 may determine whether there is a noise level of which a difference from the noise level determined in operation 720 is out of the preset range among the estimated plurality of noise levels. In this case, when there is the noise level of which the difference from the determined noise level is out of the preset range among the estimated plurality of noise levels, the forgery detection apparatus 500 may determine that the transformed data received from the client device 110 is forged.

Meanwhile, in the flowchart illustrated in FIG. 7, at least some of the steps may be performed in a different order, performed together in combination with other steps, omitted, performed in subdivided steps, or performed by adding one or more steps not illustrated.

Figure 8:
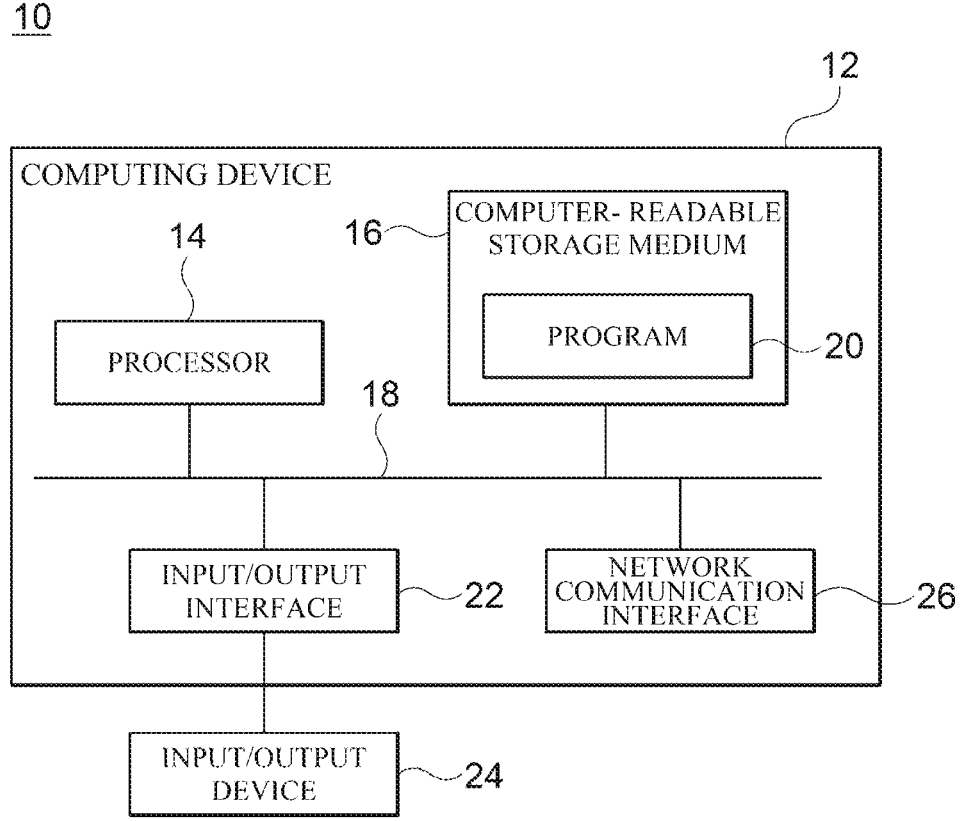
FIG. 8 is a block diagram for exemplarily illustrating a computing environment including a computing device according to an embodiment.

FIG. 8 is a block diagram for exemplarily illustrating a computing environment including a computing device according to an embodiment. In the illustrated embodiments, each component may have different functions and capabilities in addition to those described below, and additional components may be included in addition to those not described below.

The illustrated computing environment 10 includes a computing device 12. In an embodiment, the computing device 12 may be one or more components included in the apparatus for preventing forgery 200 illustrated in FIG. 2 or the forgery detection apparatus 500 illustrated in FIG. 5.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present invention has been described in detail through the representative embodiments as above, those skilled in the art will understand that various modifications may be made thereto without departing from the scope of the present invention. Therefore, the scope of rights of the present disclosure should not be limited to the described embodiments, but should be defined not only by the claims set forth below but also by equivalents of the claims.

What is claimed is:

1. A method for preventing forgery of data, comprising:
   determining a noise level based on metadata of original data;
   generating noise by applying the determined noise level to a preset noise pattern;
   generating transformed data of the original data by adding the generated noise to the original data; and
   transmitting the transformed data and the metadata to a server.

2. The method of claim 1, wherein the metadata comprises data related to at least one of an attribute of the original data, a generation time of the original data, a location where the original data is generated, a device that generates the original data, and a user who generates the original data.

3. The method of claim 1, wherein the determining comprises determining the noise level from the metadata according to a method agreed upon with the server in advance.

4. The method of claim 1, wherein the preset noise pattern is a noise pattern selected from among a plurality of noise patterns agreed upon with the server in advance.

5. The method of claim 4, wherein the generating of the noise comprises:
   selecting one of the plurality of noise patterns based on the metadata; and
   generating the noise by applying the determined noise level to the selected noise pattern.

6. The method of claim 5, wherein the selecting comprises selecting one of the plurality of noise patterns according to a selection method agreed upon with the server in advance, based on the metadata.

7. The method of claim 5, wherein the transmitting comprises transmitting, to the server, identification information on the selected noise pattern together with the transformed data and the metadata.

8. A method for detecting forgery of data, the method comprising:
   receiving transformed data of original data and metadata of the original data from a client device;
   determining a noise level based on the metadata;
   generating estimated data for the original data from the transformed data based on a preset noise pattern;
   estimating noise added to the original data to generate the transformed data, based on the transformed data and the estimated data;
   estimating a noise level corresponding to the estimated noise based on the noise pattern and the estimated noise; and
   determining whether the transformed data is forged based on the determined noise level and the estimated noise level.

9. The method of claim 8, wherein the metadata comprises data related to at least one of an attribute of the original data, a generation time of the original data, a location where the original data is generated, a device that generates the original data, and a user who generates the original data.

10. The method of claim 8, wherein the generating of the estimated data comprises generating estimated data for the original data from the transformed data by using a denoise model corresponding to the preset noise pattern.

11. The method of claim 10, wherein the preset noise pattern is a noise pattern selected from among a plurality of noise patterns agreed upon with the client device in advance.

12. The method of claim 11, wherein the generating of the estimated data comprises:
    selecting one of the plurality of noise patterns based on the metadata; and
    generating estimated data for the original data from the transformed data by using a denoise model corresponding to the selected noise pattern.

13. The method of claim 11, wherein the receiving comprises receiving, from the client device, identification information on a noise pattern corresponding to the noise added to the original data together with the transformed data and the metadata; and
    the generating of the estimated data comprises:
        selecting a noise pattern corresponding to the identification information from among the plurality of noise patterns; and
        generating the estimated data for the original data from the transformed data by using a denoise model corresponding to the selected noise pattern.

14. The method of claim 8, wherein the estimating of the noise level comprises estimating the noise level corresponding to the estimated noise from the noise pattern and the estimated noise by using a pre-trained noise level estimation model.

15. The method of claim 14, wherein the estimating of the noise level comprises:
    concatenating an image corresponding to the preset noise pattern to an image corresponding to the estimated noise;
    dividing the concatenated images into preset image patch units; and
    estimating a noise level for each region included in a sliding window of a preset size by using the noise level estimation model while sequentially moving the sliding window in the concatenated images, and
    the determining comprises determining whether the transformed data is forged based on the estimated noise level and the determined noise level for each region included in the sliding window.

16. An apparatus for preventing forgery of data, comprising:
    a noise level determiner configured to determine a noise level based on metadata of original data;
    a noise applier configured to generate noise by applying the determined noise level to a preset noise pattern, and generate transformed data of the original data by adding the generated noise to the original data; and
    transmitter configured to transmit the transformed data and the metadata to a server.

17. The apparatus of claim 16, wherein the metadata comprises data related to at least one of an attribute of the original data, a generation time of the original data, a location where the original data is generated, a device that generates the original data, and a user who generates the original data.

18. The apparatus of claim 16, wherein the noise level determiner is further configured to determine the noise level from the metadata according to a method agreed upon with the server in advance.

19. The apparatus of claim 16, wherein the preset noise pattern is a noise pattern selected from among a plurality of noise patterns agreed upon with the server in advance.

20. The apparatus of claim 19, wherein the noise applier is further configured to select one from among a plurality of noise patterns based on the metadata and generate the noise by applying the determined noise level to the selected noise pattern.

21. The apparatus of claim 20, wherein the noise applier is further configured to select one from among the plurality of noise patterns according to a selection method agreed upon with the server in advance, based on the metadata.

22. The apparatus of claim 20, wherein the transmitter is further configured to transmit, to the server, identification information on the selected noise pattern together with the transformed data and the metadata.

23. An apparatus for detecting forgery of data, comprising:
    a receiver configured to receive transformed data of original data and metadata of the original data from a client device;
    a noise level determiner configured to determine a noise level based on the metadata;
    a noise estimator configured to generate estimated data for the original data from the transformed data based on a preset noise pattern and estimate noise added to the original data to generate the transformed data based on the transformed data and the estimated data;
    a noise level estimator configured to estimate a noise level corresponding to the estimated noise based on the noise pattern and the estimated noise; and
    a determiner configured to determine whether the transformed data is forged based on the determined noise level and the estimated noise level.

24. The apparatus of claim 23, wherein the metadata comprises data related to at least one of an attribute of the original data, a generation time of the original data, a location where the original data is generated, a device that generates the original data, and a user who generates the original data.

25. The apparatus of claim 23, wherein the noise estimator is further configured to generate estimated data for the original data from the transformed data by using a denoise model corresponding to the preset noise pattern.

26. The apparatus of claim 25, wherein the preset noise pattern is a noise pattern selected from among a plurality of noise patterns agreed upon with the client device in advance.

27. The apparatus of claim 26, wherein the noise estimator is further configured to select one from among a plurality of noise patterns based on the metadata and generate estimated data for the original data from the transformed data by using a denoise model corresponding to the selected noise pattern.

28. The apparatus of claim 26, wherein the receiver is further configured to receive, from the client device, identification information on a noise pattern corresponding to the noise added to the original data together with the transformed data and the metadata, and
    the noise estimator is further configured to select a noise pattern corresponding to the identification information from among the plurality of noise patterns and generate estimated data for the original data from the transformed data by using a denoise model corresponding to the selected noise pattern.

29. The apparatus of claim 23, wherein the noise level estimator is further configured to estimate the noise level corresponding to the estimated noise from the noise pattern and the estimated noise by using a pre-trained noise level estimation model.

30. The apparatus of claim 29, wherein the noise level estimator is further configured to concatenate an image corresponding to the preset noise pattern to an image corresponding to the estimated noise, divide the concatenated images into preset image patch units, and estimate a noise level for each region included in a sliding window of a preset size by using the noise level estimation model while sequentially moving the sliding window in the concatenated images, and the determiner is further configured to determine whether the transformed data is forged based on the estimated noise level and the determined noise level for each region included in the sliding window.

\* \* \* \* \*